(12) United States Patent
Pilz

(10) Patent No.: US 10,481,649 B2
(45) Date of Patent: Nov. 19, 2019

(54) COMPUTER SYSTEM, EXPANSION COMPONENT, AUXILIARY SUPPLY COMPONENT AND USE THEREOF

(71) Applicant: Fujitsu Technology Solutions Intellectual Property GmbH, München (DE)

(72) Inventor: Erich Pilz, Königsbrunn (DE)

(73) Assignee: Fujitsu Client Computing Limited, Kawasaki (JP)

( * ) Notice: Subject to any disclaimer, the term of this patent is extended or adjusted under 35 U.S.C. 154(b) by 0 days.

(21) Appl. No.: 15/306,795

(22) PCT Filed: Apr. 19, 2016

(86) PCT No.: PCT/EP2016/058653
§ 371 (c)(1),
(2) Date: Oct. 26, 2016

(87) PCT Pub. No.: WO2017/001079
PCT Pub. Date: Jan. 5, 2017

(65) Prior Publication Data
US 2018/0120908 A1    May 3, 2018

(30) Foreign Application Priority Data
Jul. 1, 2015   (DE) .................. 10 2015 110 611

(51) Int. Cl.
*G06F 1/26* (2006.01)
*G06F 1/18* (2006.01)
(Continued)

(52) U.S. Cl.
CPC .............. *G06F 1/185* (2013.01); *G06F 1/189* (2013.01); *G06F 1/26* (2013.01); *G06F 1/263* (2013.01);
(Continued)

(58) Field of Classification Search
CPC ....................................... G06F 1/185
See application file for complete search history.

(56) References Cited

U.S. PATENT DOCUMENTS 7,952,231 B1 *   5/2011   Zansky ................. H02J 7/34
                                                       307/44
2007/0028126 A1   2/2007   Wu et al.
2011/0252249 A1  10/2011   Wang et al.

FOREIGN PATENT DOCUMENTS

DE       93 15 507 U1    12/1993
DE       696 36 406 T2    3/2007
(Continued)

*Primary Examiner* — Kim Huynh
*Assistant Examiner* — Eric Chang
(74) *Attorney, Agent, or Firm* — DLA Piper LLP (US)

(57) ABSTRACT

A computer system includes a power supply unit that provides operating energy for the computer system, a system board connected to the power supply unit and having a multitude of expansion connections for connection of a corresponding multitude of expansion components, wherein each expansion component is assigned a fixed power budget to supply an associated expansion component, a first expansion component connected to a first expansion connection of the system board, and at least one auxiliary supply component arranged in a region of a second expansion connection of the system board, wherein the auxiliary supply component electrically connects to the first expansion component and delivers at least part of the power budget assigned to the second expansion connection to the first expansion component.

18 Claims, 4 Drawing Sheets

(51) Int. Cl.
*G06F 13/40* (2006.01)
*G06F 13/42* (2006.01)

(52) U.S. Cl.
CPC .......... *G06F 1/266* (2013.01); *G06F 13/4068* (2013.01); *G06F 13/4282* (2013.01); *G06F 2213/0042* (2013.01); *Y02D 10/14* (2018.01); *Y02D 10/151* (2018.01)

(56) References Cited

FOREIGN PATENT DOCUMENTS

EP    0 807 368 B1    11/1997
EP    1 600 844 A2    11/2005

\* cited by examiner

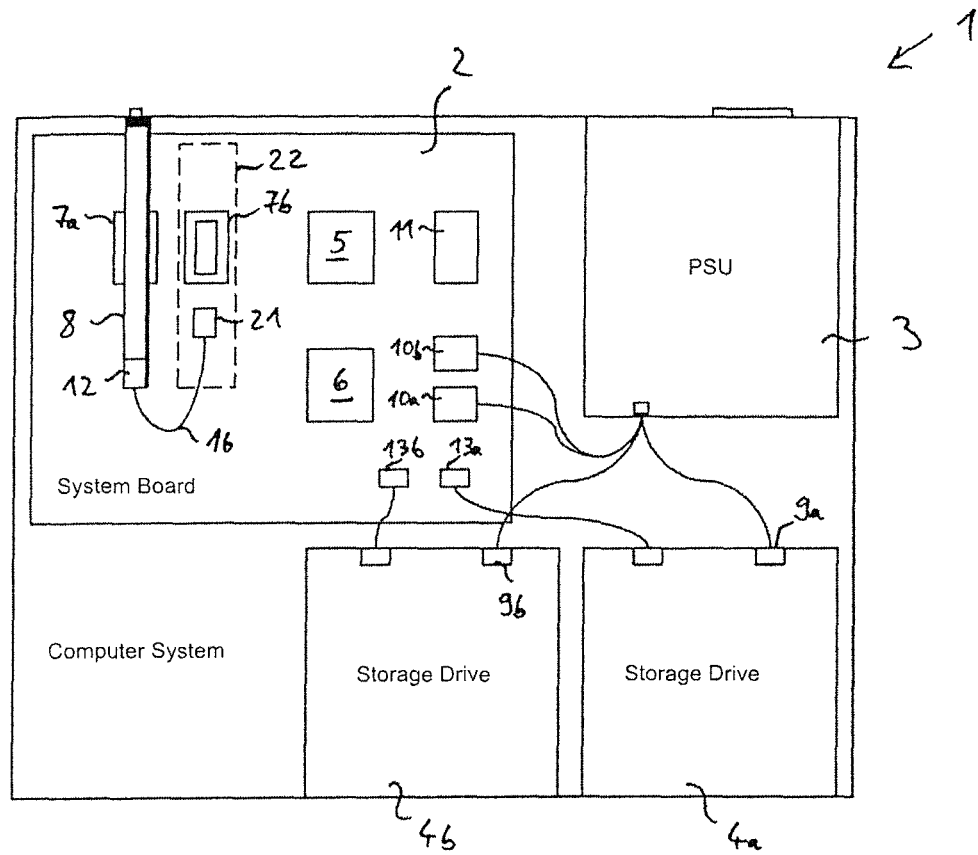
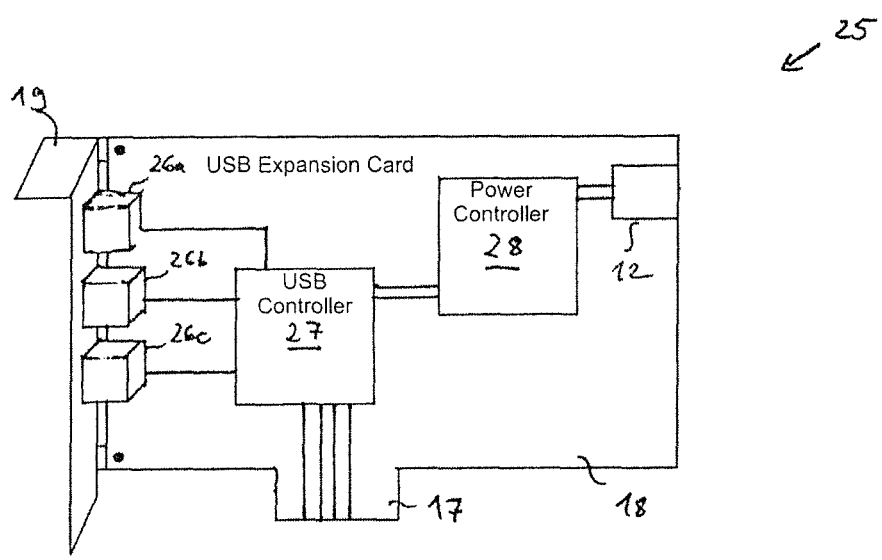

COMPUTER SYSTEM, EXPANSION COMPONENT, AUXILIARY SUPPLY COMPONENT AND USE THEREOF

TECHNICAL FIELD

This disclosure relates to a computer system comprising a power supply unit that provides operating energy for the computer system and to a system board having a multitude of expansion connections to connect a corresponding multitude of expansion components. The disclosure also relates to an expansion component and to an auxiliary supply component for use in such a computer system.

BACKGROUND

Computer systems comprising a power supply unit and a system board having expansion connections to connect expansion components are known. A multitude of personal computers (PCs) comprising a power supply unit installed and a system board are known, for example. Typically, components arranged directly on the system board such as a processor, and expansion cards plugged into plug-connectors of the system board are supplied with an operating voltage of the power supply unit via voltage supply lines provided on the system board. Other components such as mass storage drives are supplied with operating energy directly from the power supply unit via a separate cable connection.

FIG. 7 schematically shows an exemplary system configuration of a known computer system 1. Computer system 1 comprises a system board 2, an installed power supply unit 3 as well as three storage drives 4a to 4c. A processor 5, a chip set 6 as well as two expansion connections 7a and 7b in the form of plug connectors that receive expansion cards are provided on the system board. A graphics card 8 is inserted into the first expansion connection 7a.

The power supply unit 3 converts a line AC voltage, externally provided into one or a multitude of controlled DC voltages that supply the components of the computer system 1. The power supply unit 3 delivers the supply voltages to the individual components via cable connections and corresponding plug connectors. In particular, the power supply unit 3 connects to the drives 4a to 4c via plug connectors 9a to 9c. Furthermore, the power supply unit 3 connects to the system board 2 via two further cable connections and plug connectors 10a and 10b. The operating voltages provided by the plug connectors 10a and 10b are distributed further across the individual components of the system board 2, possibly including components connected to the expansion connections 7a and 7b. To that end, a voltage converter 11 is additionally provided that converts the DC voltages of 5 and 12 V, usually provided by the power supply unit 3 into a suitable voltage to operate the processor 5, for example, 1.5 V.

A particularly high-performant graphics card 8 is accommodated in the expansion connection 7a. The graphics card 8 particularly has power consumption beyond a power limit indicated in a specification of a bus system or of the expansion connection 7a. For example, the expansion connection 7a is a slot according to the PCI Express (PCIe) standard with a maximum power output of 75 Watt per slot and the graphics card 8 is a high-performance graphics card with a power consumption of up to 150 Watt. To provide the additional power required to operate the graphics card 8, the computer system 1 comprises a further cable connection having another plug connector 12 via which the graphics card 8 directly connects to the power supply unit 3.

Three data connections 13a to 13c transfer data and commands between the storage drives 4a to 4c and the system board 2 as well as components arranged thereon such as in particular the chip set 6.

Computer systems such as shown in FIG. 7 allow a modular and flexible system design. However, there is a disadvantage in that the power supply unit 3 needs to be dimensioned such that it is capable of supplying all possible system configurations with a sufficient power. Just as well, the power supply unit 3 needs to comprise cable connections and plug connectors 9, 10 and 12 according to a plurality of standards for a plurality of possible components. This leads to an oversizing of the power supply unit 3 in many system configurations and, thus, to a decrease in energy efficiency. In addition, such a system configuration causes unnecessary costs on the part of the manufacturer.

EP 1 600 844 A2 discloses a method and a device that provides increased power to a storage assembly of a storage subsystem of a computer to increase storage performance and operating stability. In particular, a power greater than the power level available through the main board of the computer is to be provided. The device comprises a supply device that supplies an input voltage to the storage subsystem directly from a power source such as in particular an ATX power supply unit.

DE 696 36 406 T2 discloses a device for voltage control in a computer system comprising a voltage control module. The device is characterized in that the voltage control module is detachable and comprises a plug receptacle assembly containing a multitude of plug receptacles mounted on the detachable voltage control module to transmit control signals and voltages. Furthermore, the device comprises a plug connector that receives the plug receptacle assembly of the detachable control module, wherein the plug connector is coupled to the computer system via a multitude of pins.

It could therefore be helpful to provide alternative design concepts for computer systems and computer systems that preferably allow a high level of modularity and are energy-efficient in operation and cost-efficient in manufacture.

SUMMARY

I provide a computer system including a power supply unit that provides operating energy for the computer system; a system board connected to the power supply unit and having a multitude of expansion connections for connection of a corresponding multitude of expansion components, wherein each expansion component is assigned a fixed power budget to supply an associated expansion component; a first expansion component connected to a first expansion connection of the system board; and at least one auxiliary supply component arranged in a region of a second expansion connection of the system board, wherein the auxiliary supply component electrically connects to the first expansion component and delivers at least part of the power budget assigned to the second expansion connection to the first expansion component.

I also provide an expansion component for connection to an expansion connection of a system board of a computer system, wherein the expansion connection is assigned a fixed power budget to supply the expansion component, including a first plug connector for connection of the expansion component to the expansion connection; a second plug connector to supply an operating energy independent from the power budget of the expansion connection; at least one third plug connector to supply an additional component or an external peripheral device with an operating energy; and a power control electrically connected to the first plug connector, the second plug connector and the at least one third plug connector, the power control adapted to limit the power taken-up via the first plug connector to the fixed power budget and to take-up from the second plug-connector at least part of an operating energy exceeding the fixed power budget and taken up by the expansion component and/or delivered via the at least third plug connector.

I further provide an auxiliary supply component for connection to an expansion connection of a system board of a computer system, wherein the expansion connection is assigned a fixed power budget to supply the expansion component, including a first plug connector for connection of the auxiliary supply component to the expansion connection; and a second plug connector that delivers at least part of the power budget assigned to the expansion connection to an expansion component of the computer system.

BRIEF DESCRIPTION OF THE DRAWINGS

FIG. 3 shows a computer system according to a second example.

FIG. 5 shows an expansion component according to a fourth example.

Figure 1:
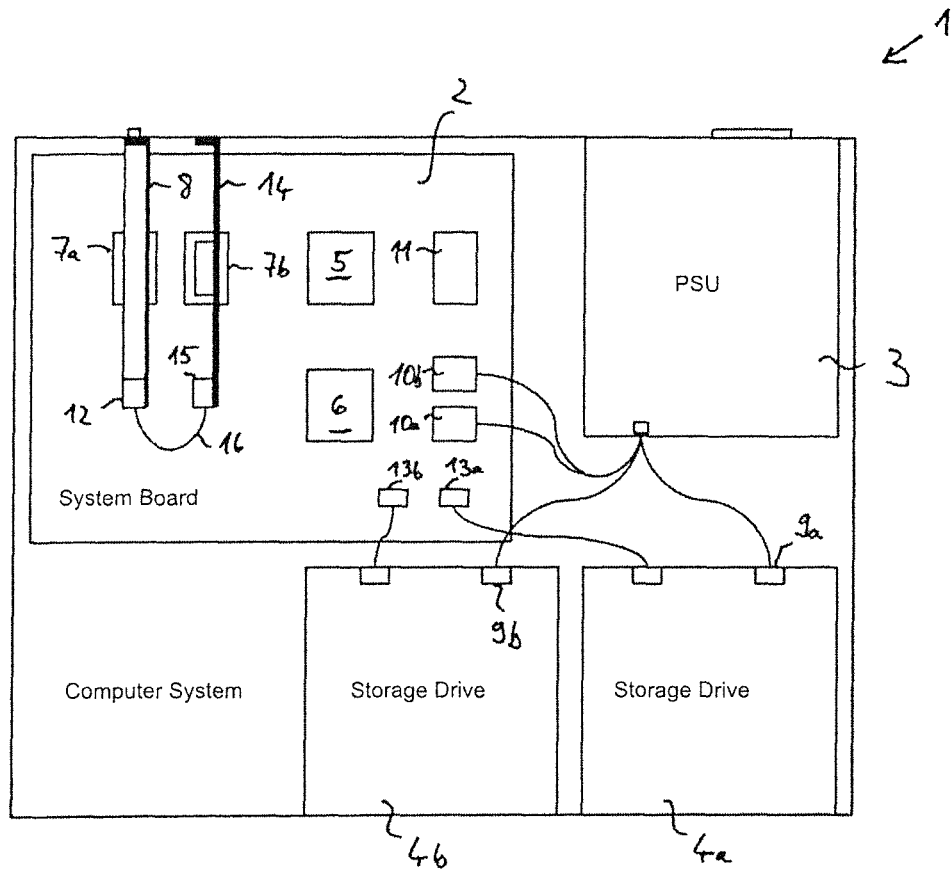
FIG. 1 shows a computer system according to a first example.

LIST OF REFERENCE NUMERALS 1 computer system
2 system board
3 power supply unit
4 storage drive
5 processor
6 chip set
7 expansion connection
8 graphics card
9 plug connector
10 plug connector
11 voltage converter
12 plug connector
13 data connection
14 auxiliary supply card
15 plug connector
16 auxiliary supply cable
17 plug connector
18 circuit board
19 slot angle
20 current limitation circuit
21 auxiliary supply connection
22 keep-free region
23 auxiliary supply connector
25 USB expansion card
26 USB connection
27 USB controller
28 power control
30 network card
31 network connection
32 network controller
33 voltage converter

DETAILED DESCRIPTION

My computer system may comprise a power supply unit that provides operating energy for the computer system and a system board connected to the power supply unit having a multitude of expansion connections to connect a corresponding multitude of expansion components, wherein a fixed power budget that supplies an associated expansion component is assigned to each expansion connection. Furthermore, the computer system comprises a first expansion component connected to a first expansion connection and at least one auxiliary supply component arranged in the region of a second expansion connection, wherein the auxiliary supply component electrically connects to the first expansion component and delivers at least a part of the power budget assigned to the second expansion connection to the first expansion component.

I found that a greater dimensioning of a power supply unit can be dispensed with in many system configurations due to provision of a power budget of an un-used expansion connection to an expansion component connected to another expansion connection. For example, the power budget of two neighboring expansion connections may be made available to an expansion component provided no further expansion components connect to the second expansion connection or at least their power budget is not exhausted. In this case, an overall power budget of the computer system is maintained in any configuration possible, without increasing the output power of a power supply unit. At the same time, possibly provided special connectors need to be provided to supply individual components by an auxiliary supply component in the computer system only when these are actually required, thus reducing production costs.

Typically, the first expansion component comprises an internal current consumer. Optionally, the first expansion component also at least delivers part of the power taken-up to an additional component such as a peripheral device. The internal current consumer and, if applicable, the additional component taken together have a power budget greater than the power budget assigned to the first expansion connection.

Such a current supply concept for a computer system is suitable in particular for power supply of high-performance graphics components such as graphics cards inserted into a plug connector according to the PCI Express (PCIe) standard or a similar expansion connection, for example, and which require being supplied by an additional operating voltage via a supply cable. Such graphics cards can be used without providing a special power supply unit having a special supply cable as well as a power budget assigned to the supply cable.

The auxiliary supply component may be an auxiliary supply card inserted into the second expansion connection or an inserted auxiliary supply plug, for example. Auxiliary supply components designed in such a way, mainly passively or entirely passively allow a simple and cost-efficient provision of further operating energy to other components from a power budget assigned to the second expansion connection.

Alternatively, the auxiliary supply component may comprise an auxiliary supply connection arranged on the system board in the vicinity of the second expansion connection as well as an auxiliary supply cable connected to the auxiliary supply connection by a plug connector. The auxiliary supply cable in the inserted state blocks using the second expansion connection by another expansion component. Arranging the second expansion connection and the auxiliary supply connection physically next to one another ensures the alternative, but not simultaneous use of the two connections and the associated power budget in a simple manner. Moreover, provision of a special auxiliary supply card can be dispensed with in this case.

I also provide an expansion component for connection to an expansion connection of a system board of a computer system. For example, this is an expansion card for insertion in a plug connector of a system board. The expansion connection is assigned a fixed power budget to supply the expansion component. The expansion component comprises a first plug connector that connects the expansion component to the expansion connection, a second plug connector that supplies an operating energy independent from the power budget of the expansion connection and at least one third plug connector that supplies an additional component, in particular an external peripheral device, with operating energy. Furthermore, the expansion component comprises a power control electrically connected to the first plug connector, the second plug connector and the at least one third plug connector, the control being set-up to limit the power taken-up via the first plug connector to the fixed power budget and to take-up at least a part of an operating energy taken up by the expansion component and/or delivered via the at least third plug connector, which exceeds the fixed operating budget, of the second plug connector.

Such an expansion component allows supplying additional components, in particular external periphery devices, with an operating energy that is above a power budget of an expansion connection of a system board. For example, a multitude of peripheral devices connected via USB connections can be supplied with an overall power above the power capacity of in internal bus system or a plug connector such as a PCIe expansion slot.

I further provide an auxiliary supply component for connection to an expansion connection of a system board of a computer system. For example, this is an auxiliary supply card for insertion into a plug connector of a system board. The expansion connection is assigned a fixed power budget that supplies the expansion component. The auxiliary supply component comprises a first plug connector for connection of the auxiliary supply component to the expansion connection and a second plug connector that delivers at least a part of the power budget assigned to the expansion connection to an expansion component of the computer system.

Such an auxiliary supply component is particularly suitable for supplying of especially high-performant expansion components, e.g., in a modular computer system, for example.

The underlying idea is, inter alia, to use part of a power budget assigned to a second expansion connection of a system board of a computer system for the at least partial supply of an expansion component connected to a first expansion connection of the system board with an operating energy, wherein each expansion component is assigned a fixed power budget.

Further advantages are disclosed in the following description of examples. My computer systems, component and use will hereinafter be described in detail with reference to the Figures.

For the sake of clarity, like or equivalent components are indicated with the same reference numerals throughout the drawings. Unless provided otherwise, the description of the respective components likewise applies to the other examples. Multiple instances of similar components are indicated with an alphabetic suffix. Use of the alphabetic suffix is omitted when all components of a certain type are addressed.

Figure 7:
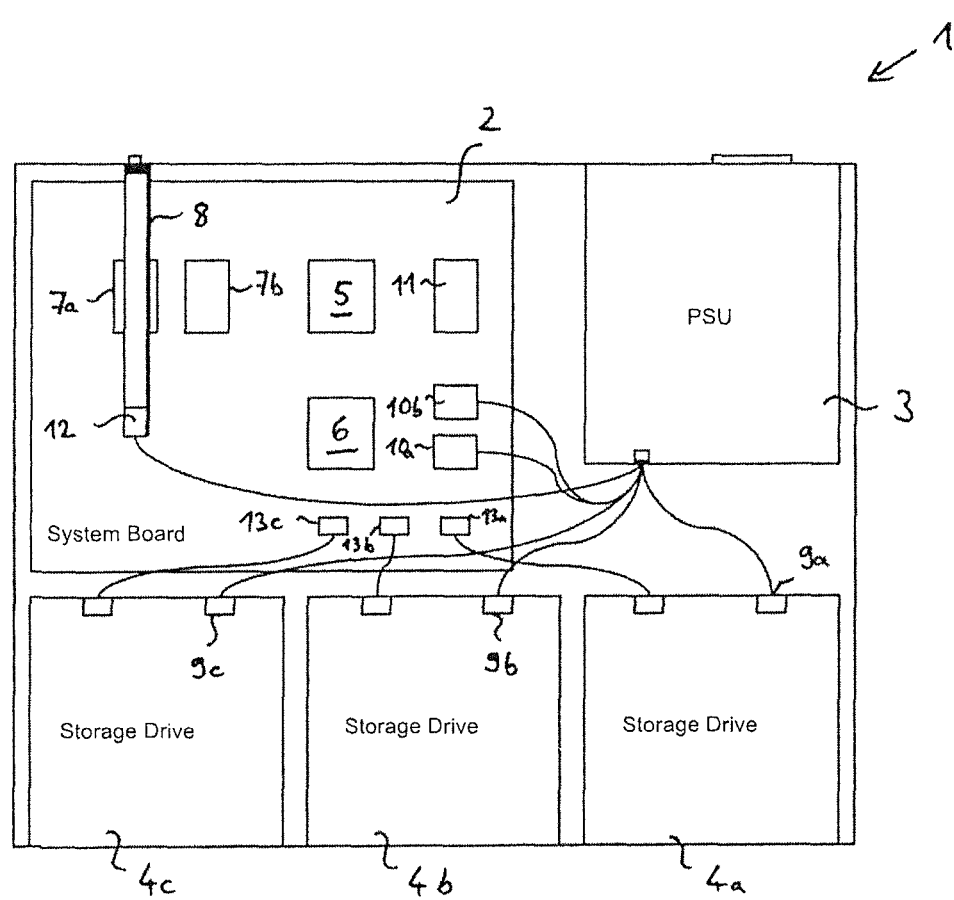
FIG. 7 shows a known system configuration of a computer system.

FIG. 1 shows a computer system 1 according to an example. Computer system 1 comprises essentially the same components 2 to 11 as the computer system 1 of FIG. 7. In contrast, a comparatively low-performant power supply component in the form of a power supply unit 3 having only four connection cables and corresponding plug connectors 9a, 9b, 10a, and 10b to supply components 4a, 4b and 2 is used in the computer system 1 of FIG. 1. In an alternative configuration (not shown), voltage supply of the computer system 1 is effected by at least one voltage control arranged directly on the system board 2. This is suitable in particular for computer systems 1 that have a very compact design.

In the computer system 1 of FIG. 1, only two storage drives 4a and 4b are provided. They are supplied with operating energy via corresponding plug connectors 9a and 9b of the power supply unit 3 and connected to the system board 2 by corresponding data connections 13a and 13b. The operating energy for all further components is transmitted to the system board 2 via the plug connectors 10a and 10b and distributed across the remaining components by the system board.

In the computer system 1 of FIG. 1, an auxiliary supply card 14 is provided to supply the graphics card 8. The auxiliary supply card 14 comprises a plug connector 15 for connection to an auxiliary supply cable 16, the connector being connected to a further plug connector 12 to supply the graphics card 8. In the example, the two plug connectors 7a and 7b of the system board 2 are so-called PCIe X16 slots having a maximum power output of 75 Watt, for example. As a result, by combining the power budgets of the two expansion connections 7a and 7b by the auxiliary supply card 14, the graphics card 8 can be provided with a total power of 150 Watt without loading the power supply unit 3 beyond the capacity thereof.

Figure 2:
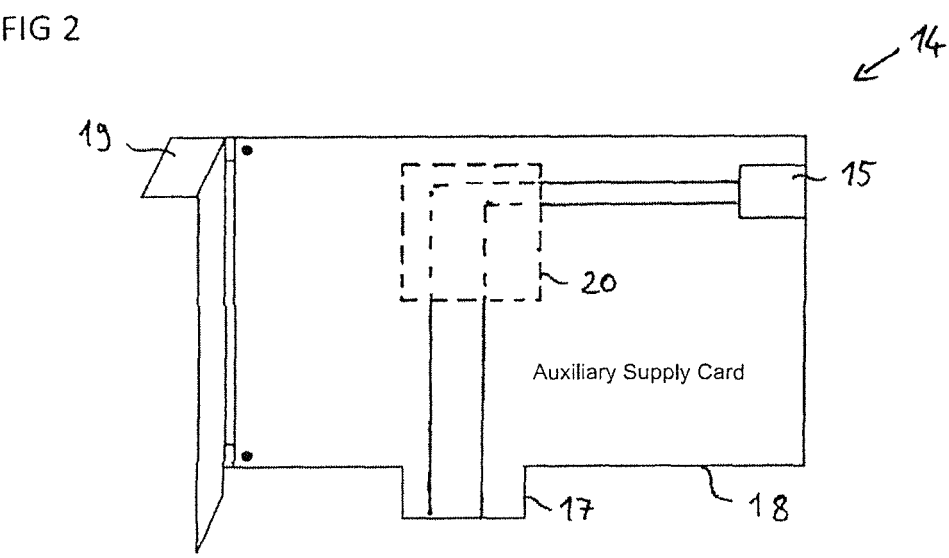
FIG. 2 shows an auxiliary supply card according to the first example.

FIG. 2 schematically shows the structure of the auxiliary supply card 14. Besides the plug connector 15, the auxiliary supply card 14 comprises a standard-conform plug connector 17 for insertion into the expansion connection 7b. The plug connector 17 is part of a circuit board 18 in which the plug connector 15 is soldered directly in the illustrated example. The circuit board 18 electrically connects the plug connector 17 to the plug connector 15. In the illustrated example for a desktop computer, the board also mechanically fastens the auxiliary supply card 14. To that end, additionally, a slot angle 19 is fastened to the circuit board 18. Alternatively, for a server computer for insertion into a server rack (not shown), the slot angle may be dispensed with, provided the plug connector 17 and/or other fasteners for the auxiliary supply card 14 are sufficient. In another variant (also not shown) of the auxiliary supply card 14, the card does not include a soldered plug connector 15. Instead, the auxiliary supply cable 16 is directly soldered to the circuit board 18 and merges into the plug connector 12 for connection to the graphics card 8.

Optionally, a current limitation circuit 20 is provided on the auxiliary supply card 14. The current limitation circuit 20 limits the power taken-up via the plug connector 17 to a predetermined power budget. This may be a purely passive component such as a melt fuse, for example, or an active electronic circuit that particularly detects the type of expansion connection 7 into which the auxiliary supply card 14 has been inserted. Provision of an addition current limitation circuit 20 excludes a damage or overload of the expansion connection 7b, the system board 2 and the power supply unit 3 in any case.

FIG. 3 shows a second example of a computer system 1. The structure of the computer system 1 essentially corresponds to the computer system 1 according to FIG. 3. Instead of providing an additional auxiliary supply card 14, the graphics cards 8 according to FIG. 3 is supplied with additional operating energy via an auxiliary supply cable 16, the cable being inserted into an auxiliary supply connection 21 of the system board 2 by a corresponding plug. In place of the graphics card 8, even another component of the computer system 1 may be supplied with an operating energy via the auxiliary supply cable 16.

The auxiliary supply connection 21 is arranged in a keep-free region 22 of the expansion connection 7b. Most standards for expansion components such as the PCI Express standard, for example, define such keep-free regions 22. Arranging the auxiliary supply connection 21 in or below the keep-free region 22, respectively, practically prevents the simultaneous use of the auxiliary supply connection 21 and the expansion connection 7b. If the auxiliary supply cable 16 is inserted into the auxiliary supply connection 21, the cable mechanically prevents a further expansion component from being inserted into the expansion connection 7b. In contrast, an expansion component arranged in the expansion connection 7b prevents use of the auxiliary supply connection 21. The simple mechanical measure may prevent a double use of the power budget of the second expansion connection 7a.

Figure 4:
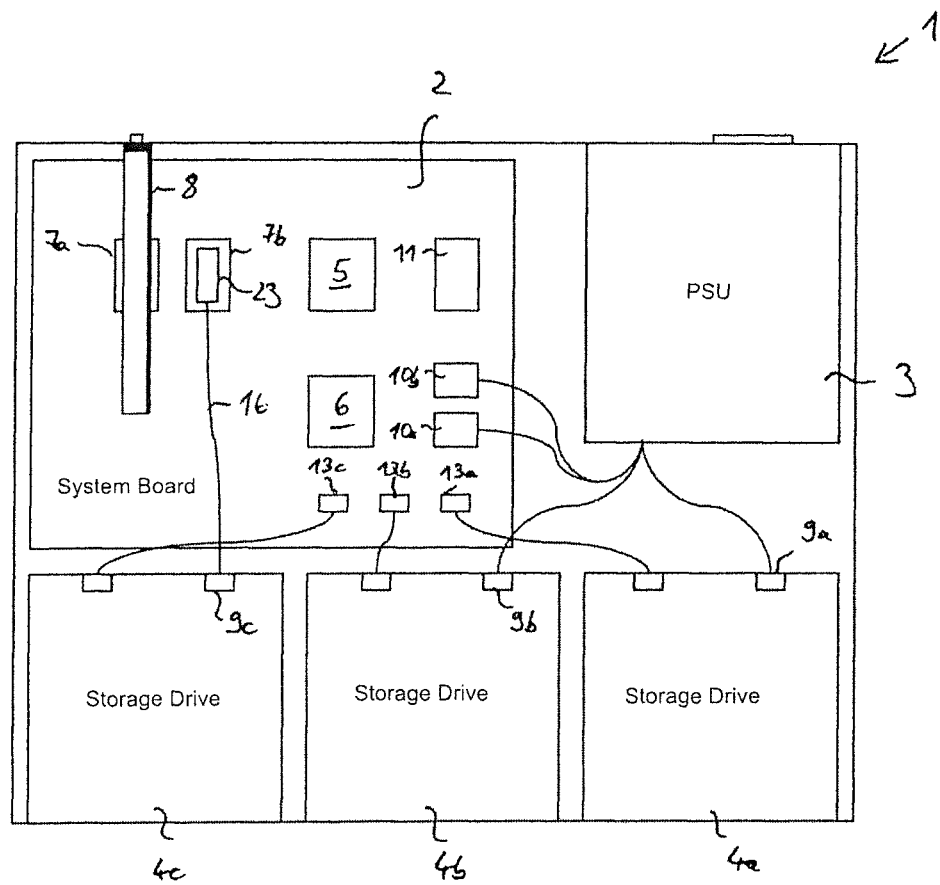
FIG. 4 shows a computer system according to a third example.

FIG. 4 shows another example of a computer system 1. In contrast to the computer systems 1 of FIGS. 1 and 3, computer system 1 of FIG. 4 comprises an additional storage drive 4c and an additional data connection 13c for connecting the third storage drive 4c. However, in contrast to the computer system 1 according to FIG. 7, the power supply unit 3 still has only two cable connections to corresponding plug connectors 9a and 9b to supply the first two storage drives 4a and 4b. To nevertheless supply the third storage drive 4c with an operating energy, a specific auxiliary supply plug 23 is inserted into the expansion connection 7b of the system board 2, the plug being connected to a further plug connector 9c via an auxiliary supply cable 16. In this case, the auxiliary supply plug 23 prevents use of the expansion connection 7b by additional expansion cards. Instead, the power budget of the expansion slot in the region of the expansion connection 7b is used for operation of the third storage drive 4c. Thus, even in this case, a comparatively simple power supply unit 3 having a relatively low power budget can be used as well.

Figure 6:
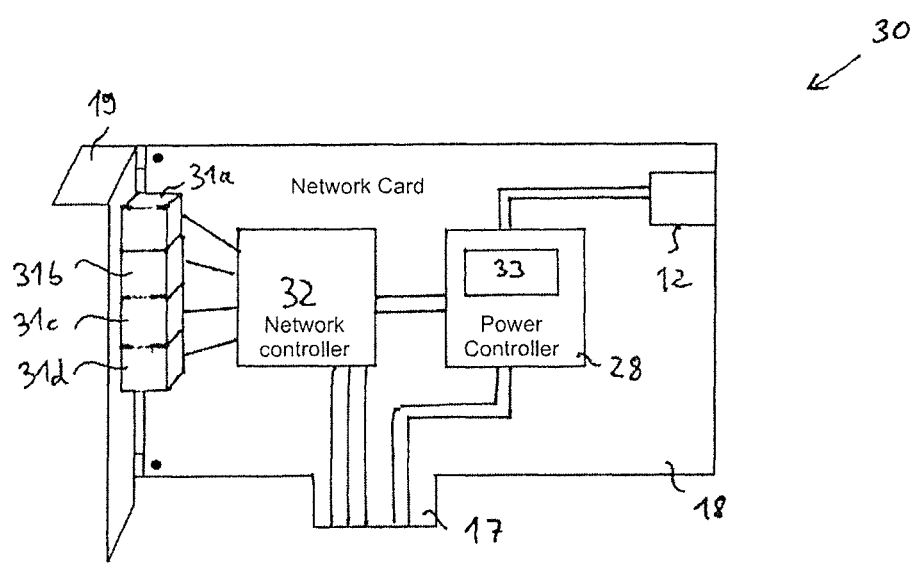
FIG. 6 shows an expansion component according to a fifth example.

Co-use of power budgets of other expansion connections can also be used to supply high-performant components other than graphics cards and internal storage drives 4. Two examples of such a use are illustrated in FIGS. 5 and 6, respectively.

FIG. 5 shows a USB expansion card 25. The USB expansion card 25 comprises a circuit board 18 having a plug connector 17 for insertion of the USB expansion card 25 into an expansion connection 7. On the side of the slot angle 19, the expansion card 25 comprises three USB connections 26a to 26c in the example. The USB connections 26 are so-called Powered USB connections according to the USB 3.0 standard or later, for example, such as the USB 3.1 standard. A USB controller 27 is arranged on the circuit board 18, the controller serving for the data exchange between peripheral devices connected to the USB connections 26 and a component of the system board 2, e.g., a chip set 6. Besides the common functions of a USB host controller, the USB controller 27 assumes protocol translation between the USB protocol and the PCIe protocol. Furthermore, the USB controller 27 monitors or configures power consumption of peripheral devices connected to the USB connections 26.

As far as power output via the USB connections 26 is in the range of the power budget of the expansion connection 7, for example, of a PCIe plug connector with a maximum power output of 75 Watt, the peripheral devices are supplied by the power provided via the plug connector 17.

However, if the USB controller 27 detects that the power limit of 75 watt is exceeded through the connection of especially high-performant or especially many peripheral devices, the controller actuates a power control 28 of the USB expansion card 25 such that the latter takes-up at least a part of the required operating energy via a further plug connector 12. The plug connector 12 may connect to an auxiliary supply card 14 according to FIGS. 1 and 2, an auxiliary supply connection 21 according to FIG. 3 or an auxiliary supply plug 23 of FIG. 4 via an auxiliary supply cable 16 (not shown in FIG. 5). Alternatively, supply is also possible via an additional supply cable of a prepared power supply unit 3 according to FIG. 7 specifically prepared for the power supply of high-performance graphics cards 8.

When the power supply 28 detects that no operating energy or in sufficient operating energy is provided via the plug connector 12, the supply returns a corresponding status message to the USB controller 27, which thereupon informs the one or more peripheral devices to limit its or their power consumption accordingly. Alternatively, or in addition, the USB controller 27 completely switches-off one of the USB connections 26a to 26c to observe the available power budget.

The USB expansion card 25 illustrated in FIG. 5 allows a particularly flexible provision of available energy of a power supply unit 3 to peripheral devices connected to the computer system 1. This way, the computer system 1 may be adapted to later versions of the USB protocol, for example, without requiring an exchange of the power supply unit 3 or of the chip set 6.

FIG. 6 shows another configuration in the form of a network card 30. On the side of the slot angle 19, the network card 30 comprises four network connections 31a to 31d. The network connection 31a to 31d interconnect via a network controller 32, for example, a switch component or a hub component. The network connections 31a to 31d are operated through the network controller 32 as so-called power-over-ethernet connections. The network card 30 assumes the function of the power sourcing equipment (PSE). Powered devices (PD) such as so-called VoIP telephones may be connected to the network connections 31.

Depending on the available power class of the connected network components, the power delivered via the connections 31 may be all in all above a power budget of a PCIe connection of the system board 2. For compensation of the possibly missing power budget, a circuit for power supply 28 as well as a plug connector 12 to supply the network card 30 from an auxiliary supply component is arranged in a circuit board 18 of the network card 30 as described with reference to FIG. 5.

The supply voltage of typically 36 to 57 V provided in the field of Power-over-Ethernet (PoE) is above the supply voltage of the computer system 1 typically provided by a power supply unit 3. A voltage converter 33 converts the supply voltage of the computer system 1 to the voltage output by the network connections 31 in the example of FIG.

6. In the example, the voltage converter 33 is integrated into the power supply 28. The voltage converter 33 is supplied with operating energy either via a voltage supply line of the plug connector 17, a voltage supply line of plug connector 12 or a combination of both voltage sources. For example, this may be a switch converter with two parallel arranged switching stages, the switching stages of which being connected to the plug connector 17 and the plug connector 12, respectively.

The configurations described in FIGS. 1 to 6 can be combined with one another in various ways.

Furthermore, other modifications of my concepts are possible. For example, power of three or more expansion connections may be combined with one another in the type of a cascade to supply expansion components having even higher power consumption. In particular when providing an electric connection between a multitude of neighboring expansion cards according to the Daisy-Chain-principle, it is advantageous to provide a control circuit of each of the expansion cards, the circuit monitoring the energy consumption of the respective card and controlling the transfer of possibly excessive energy to neighboring cards. Furthermore, it is also possible to combine expansion connections of different types for the purpose of the power supply. For example, the power budget of a slot connector that receives an expansion card and a pin header or a female connector for connection of a supply cable of an internal device such as an internal storage drive can be combined with one another, for example.

Furthermore, a current or data supply may be combined in many cases. For example, a graphics card can be provided with a modified Display Port connection that provides the operating energy to operate a display, in particular a liquid crystal display, besides the graphics data. In this case, for example, a graphics processor of a graphics card can be supplied from the power budget of the slot in that the graphics card is inserted per se. The additional power for the externally connected display can be provided to the graphics card via an auxiliary supply component according to one of the above-described examples.

Besides supplying graphics components such an assembly is naturally also suitable for power supply of external mass storage devices, printers or scanners via a data cable having an integrated supply line. In this case, use of an USB connection according to the USB 3.1 standard having a power profile of more than 75 Watt, e.g., the power profile 5 with 100 watt, is suitable in particular.

The invention claimed is:

1. A computer system comprising:
a power supply unit that provides operating energy for the computer system;
a system board connected to the power supply unit and having a processor, a chip set and a multitude of expansion connections in the form of plug connectors for connection of a corresponding multitude of expansion cards, wherein each expansion connection is assigned a fixed power budget to supply an associated expansion card;
a first expansion card connected to a first expansion connection of the system board, the first expansion card having a first plug connector adapted to receive at least a part of a predefined operating energy of the first expansion card, wherein the first expansion card has a power consumption greater than the fixed power budget allocated to the first expansion connection of the system board; and
at least one auxiliary supply component arranged in a region of a second expansion connection of the system board, wherein the auxiliary supply component is electrically connected via an auxiliary supply cable directly to the first plug connector of the first expansion card and delivers at least part of the power budget assigned to the second expansion connection to the first expansion card such that the power budget of the computer system is maintained in operation.

2. The computer system according to claim 1, wherein the first expansion card comprises an internal electrical consumer and the internal electrical consumer has an electrical power consumption greater than the power budget assigned to the first expansion connection.

3. The computer system according to claim 2, wherein the internal electrical consumer is a data processing unit, a graphics processor, a USB controller or a network controller.

4. The computer system according to claim 1, wherein the first expansion card comprises an internal electrical consumer and a connection to supply an additional component or an external peripheral device, with operating energy, and the internal electrical consumer and the additional component taken together have an electrical power consumption greater than the power budget assigned to the first expansion connection.

5. The computer system according to claim 4, wherein the internal electrical consumer is a data processing unit, a graphics processor, a USB controller or a network controller.

6. The computer system according to claim 1, wherein at least the first expansion connection and the second expansion connection are configured as equivalent-type plug connectors.

7. The computer system according to claim 6, wherein the first expansion connection and the second expansion connection are configured to receive internal expansion cards.

8. The computer system according to claim 7, wherein the first expansion connection and the second expansion connection are slot connectors of the system board according to the PCI Express (PCIe) standard with a maximum power output of 75 Watt per slot connector.

9. The computer system according to claim 1, wherein the first expansion connection receives an internal graphics component as the first expansion card or a plug connector according to the Peripheral Components Interconnect Express, PCIe, standard or the PCI for Graphics, PIG, standard for receiving a graphics card, and the graphics components comprise the first plug connector to supply an additional operating voltage via the auxiliary supply cable.

10. The computer system according to claim 1, wherein the auxiliary supply component comprises an auxiliary supply card inserted in the second expansion connection or an auxiliary supply plug inserted in the second expansion connection.

11. The computer system according to claim 1, wherein the auxiliary supply component comprises an auxiliary supply connection arranged on the system board in a vicinity of the second expansion connection as well as the auxiliary supply cable connected to the auxiliary supply connection by a second plug connector, and the auxiliary supply connector in the inserted state blocks use of the second expansion connection by a further expansion card.

12. An expansion card for connection to first expansion connection of a system board of a computer system, wherein the system board further comprises a processor, a chip set and a second expansion connection, and each one of the first and second expansion connection is assigned a fixed power budget to supply the expansion card, the expansion card comprising:
- a first plug connector for connection of the expansion card to the first expansion connection;
- a second plug connector to receive an auxiliary supply cable, said auxiliary supply cable supplies at least part of an operating energy allocated to the second expansion connection directly to the expansion card connected to the first expansion connection;
- at least one third plug connector to supply an additional component or an external peripheral device with an operating energy; and
- a power control circuit electrically connected to the first plug connector, the second plug connector and the at least one third plug connector, the power control circuit adapted to limit the power taken-up via the first plug connector to the fixed power budget and to take-up from the second plug-connector at least part of an operating energy exceeding the fixed power budget, allocated to the second expansion slot and taken up by the expansion card and/or delivered via the at least third plug connector.

13. The expansion card according to claim 12, further comprising a voltage converter, wherein the voltage converter converts a first operating voltage provided via the first plug connector and/or the second plug connector into a second operating voltage provided via the at least one third plug connector.

14. The expansion card according to claim 12, wherein the expansion card is an internal expansion card for insertion into a plug connector of a system board of the computer system.

15. The expansion card according to claim 14, in which the at least one third plug connector is a peripheral device connection for combined transfer of operating voltage and data, a Universal Serial Bus, USB, connection or Powered USB connection, and the data for the third plug connector are transmitted to the system board via the first plug connector.

16. An auxiliary supply component for connection to a first expansion connection of a system board of a computer system, wherein the system board further comprises a processor, a chip set and a second expansion connection, each one of the first and second expansion connections is assigned a fixed power budget to supply an expansion card connected to the first second expansion connection, comprising:
- a first plug connector for connection of the auxiliary supply component to the first expansion connection; and
- a second plug connector that delivers at least part of the power budget assigned to the first expansion connection via an auxiliary supply cable directly to a first plug connector of the expansion card of the computer system connected to the second expansion connection by a second plug connector of the expansion card.

17. The auxiliary supply component according to claim 16, wherein the auxiliary supply component is configured as an internal auxiliary supply card for insertion into a plug connector of the system board of the computer system.

18. The auxiliary supply component according to claim 17, wherein the auxiliary supply card is arranged in a region of the first expansion connection of the system board of the computer system, the computer system further comprising:
- a power supply unit that provides operating energy for the computer system;
- wherein the system board is connected to the power supply unit; and
- the expansion card connected to the second expansion connection of the system board, wherein the auxiliary supply component electrically connects to the expansion card and delivers at least part of the power budget assigned to the first expansion connection to the expansion card.

* * * * *